Oct. 20, 1964     L. O. VARGADY     3,153,689

MIRROR SYSTEM

Filed May 4, 1961

INVENTOR.
LESLIE O. VARGADY
BY Frank C. Parker
David E. Dougherty
ATTORNEYS

3,153,689
MIRROR SYSTEM
Leslie O. Vargady, Rochester, N.Y., assignor to Bausch & Lomb Incorporated, Rochester, N.Y., a corporation of New York
Filed May 4, 1961, Ser. No. 107,685
1 Claim. (Cl. 88—14)

This invention relates to a novel mirror system for use with an autocollimator or the like, and more particularly, to a novel mirror system for producing a relatively large error indication in response to a relatively small misalignment.

Mirror systems for multiplying discrepancy angles by multiple reflections have been proposed for use in optical comparators. An example of such systems is shown by the patent to Egelsen No. 2,739,504. Egelsen's device indicates an angular discrepancy between a control member and a controlled member. Comparator systems of this type are not readily adaptable to measure the flatness of a surface or alignment of a surface which is relatively far from a measuring scale.

Autocollimators are used for alignment purposes and provide indications regarding angular orientation of an object relative to the autocollimator. The present invention is directed toward devices for improving the accuracy of autocollimators by effectively magnifying the error indications to which they are responsive.

The practice of the present invention overcomes to a high degree the limitations of commercial autocollimators and comparator mirror systems. A device according to the present invention includes a pair of angularly related generally confronting mirrors. The confronting mirrors provide for multiple reflections of a light beam therebetween to thereby multiply any divergence between the incident and the reflected rays. The device is adapted to measure flatness or alignment of surfaces which are spaced at a relatively large distance from one another or from a scale. Particularly where discrepancies in alignment or flatness are relatively small, the present device enables accurate readings on a relatively fine scale.

Advantageously the device may be used to make accurate measurements or to indicate minute irregularities in a surface. Furthermore the device may be adapted to measure or align vertical or offset surfaces as well as those in a horizontal plane.

Damping means may be incorporated in the mirror system described herein to reduce the effects of vibration or inadvertent displacement of the mirrors.

Figure 1:
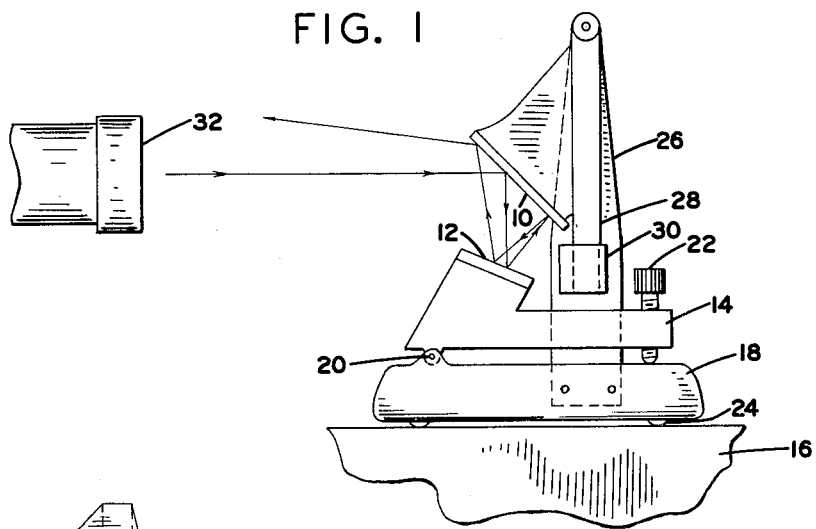
FIG. 1 is a side elevational view partly schematic showing a first embodiment of the invention.

Briefly, the invention comprises a pair of angular related confronting mirrors arranged on a carriage. The carriage has spaced contact points for contacting a surface or a workpiece. One of the mirrors is fixed to the carriage for movement therewith in response to variations in the workpiece surface as the carriage is moved along the surface. The second mirror is suspended on the carriage so that its angular position relative to the carriage is determined by gravity. The second mirror may be suspended upon a pendulum or floated upon a liquid such as mercury. Damping may be provided to prevent oscillation of the second mirror and to maximize its angular stability. The carriage may be moved in translation to thereby improve the reference mirror along the line of sight of the autocollimator whereby deviation between the incident and the reflected ray of light will be multiplied by the effect of multiple reflections between the mirrors.

Referring now more particularly to the drawings, a novel mirror system according to the invention comprises a reference mirror 10 and a second mirror 12 mounted on a carriage 14 in geneally confronting angular relation. The second mirror 12 is fixed to the carriage 14 and moves with the carriage 14 as the angular orientation of the carriage changes. The orientation of the carriage changes in accordance with surface changes as the carriage is moved over the surface. Adjusting means may be provided such as a pivot assembly 20 and adjusting screw 22. The carriage 14 includes a base 18 with spaced contact points 24 for engaging the surface of a workpiece 16.

A member 26 is fixed to the carriage 14 and extends upwardly therefrom. A pendulum 28 is pivotally mounted on the member 26. The reference mirror 10 is fixed to the pendulum 28 below the pivot mounting so that its angular relationship with respect to a vertical plane is fixed by gravity. A weight 30 provides additional mass for maintaining angular orientation of the pendulum 28.

The weight 30 may be of non-magnetic, electrically conductive material so that a magnet may be fixed to the member 26 in a manner that will provide eddy current damping of the device.

In operation the mirror system is moved in translation along the line of sight of an autocollimator 32. The reference mirror 10 reflects the light rays received from the autocollimator 32 onto the second mirror 12, which reflects the rays back to the reference mirror 10. The mirror 10 reflects the rays back to the autocollimator 32 when the surface being measured is flat and the mirrors are adjusted to thereby receive collimated light the incident light rays are retro-directed by the system. As the angular orientation of the carriage 14 changes in accordance with the surface configuration as the carriage 14 is moved therealong, the light rays will follow a different path and will be reflected twice between the second mirror 12 and the reference mirror 10. The deviation between the incident and the reflected rays will be multiplied by the effect of the multiple reflections between the mirrors 10 and 12.

Figure 2:
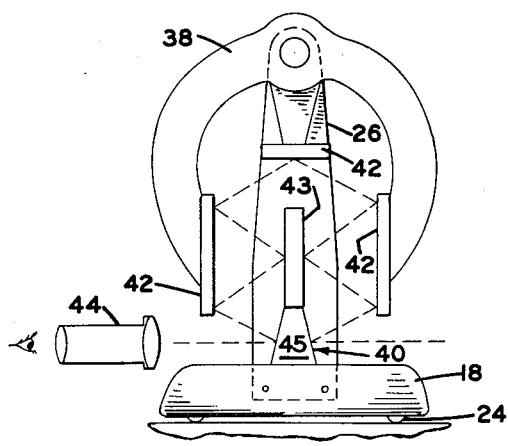
FIG. 2 is a side elevational view partly schematic showing a second embodiment of the invention.

A modified mirror system shown in FIG. 2 is particularly applicable for use with a collimator or target and a telescope. The system comprises a pendulum 38 and three reference mirrors 42 fixed to the pendulum 38. The three reference mirrors 42 are arranged so that two of the mirrors are in parallel confronting relationship to each other and the third reference mirror 42 is arranged perpendicular to the two parallel reference mirrors 42 but offset from the area between the parallel reference mirrors 42. The faces of the three reference mirrors 42 are arranged in a manner that is generally similar to three sides of a square with the reflecting surfaces facing inwardly toward the center of the square. A mirror assembly 40 is arranged so that it extends upwardly between the parallel reference mirrors 42. The mirror assembly 40 comprises a relatively flat vertical upper portion 43 having two reflective parallel sides in back to back relation and a lower portion 45 which resembles a trapezoid with its top terminating at the base of the upper portion 43. The inclined sides of the lower portion 45 are coated with a reflective coating on their outer faces. This arrangement provides multiple reflections between the reference mirrors 42 and the mirror assembly 40, so that the deviation between the line of sight incident on a first face of the mirror assembly 40 and the exit face of the assembly 40 will be multiplied by the effect of the multiple reflections between the reference mirrors 42, and the mirror assembly 40. Such changes in the angular orientation are caused by any surface irregularities as the system is moved over the surface. The pendulum mounting member 38 is arranged in a similar manner to the mounting shown in the first embodiment. In FIG. 2, the line of sight is indicated by an eye looking through a telescope 44 and extends to a collimator or reticle (not shown).

Figure 4:
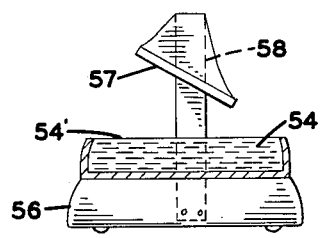
FIG. 4 is a side elevational view partly schematic showing a fourth embodiment of the invention.
Figure 3:
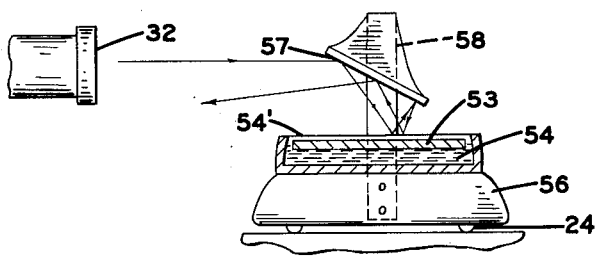
FIG. 3 is a side elevational view partly schematic showing a third embodiment of the invention.

FIG. 3 illustrates a third embodiment of the invention, wherein a reference mirror 53 is floated on the surface of a quantity of mercury 54. In some cases it may be desirable to use other fluids or as illustrated in FIG. 4, to use the surface of the mercury as the reflecting element. The mercury may be used as the reflecting element but it is normally preferred to float a mirror on the surface. The mercury 54 is contained in a hollow receptacle 54' which is fixed to a carriage 56. The carriage 56 has a second mirror 57 mounted on an upwardly extending member 58. The mirror 57 is arranged to confront the mirror 53 but is angularly oriented and spaced therefrom. An autocollimator 32 is arranged in a manner similar to the one shown in the first embodiment.

Changes may be made in the present invention without departing from the scope thereof.

What is claimed is:

A mirror system for use with an autocollimator or the like comprising a movable carriage adapted for movement on a horizontal planar surface, a pair of mirrors adapted to receive light from the autocollimator mounted on said carriage in generally confronting angular relation to each other, the angular relationship of said mirrors being such that light incident upon a first of said mirrors is reflected to the other of said mirrors and reflected thereby back to the first of said mirrors, said pair including a mirror mounted on said carriage and fixed thereto for rotation about a horizontal axis in response to the similar rotational movement of said carriage, a pendulum rotatable about a horizontal axis, which is perpendicular to the direction of movement, mounted on said carriage, the other of said mirrors fixed to said pendulum and adapted to rotate relative to the carriage but angularly fixed with respect to a vertical plane by gravity whereby any deviation between an incident and a reflected light ray caused by movement of said carriage will be multiplied by the effect of multiple reflections between the mirrors.

References Cited in the file of this patent
UNITED STATES PATENTS

| | | |
|---|---|---|
| 921,773 | Wild | May 18, 1909 |
| 1,639,229 | Luckey | Aug. 16, 1927 |
| 1,736,682 | Tuckerman | Nov. 19, 1929 |
| 2,124,892 | Nichols | July 26, 1938 |
| 2,460,836 | Lovins | Feb. 8, 1949 |
| 2,503,422 | Silverman et al. | Apr. 11, 1950 |
| 2,607,260 | Cowley | Aug. 19, 1952 |
| 2,670,660 | Miller | Mar. 2, 1954 |
| 2,739,504 | Egelsen | Mar. 27, 1956 |
| 2,867,149 | Goddard | Jan. 6, 1959 |
| 2,876,673 | Hamilton | Mar. 10, 1959 |
| 2,981,141 | Armstrong et al. | Apr. 25, 1961 |

FOREIGN PATENTS

| | | |
|---|---|---|
| 1,204,815 | France | Aug. 10, 1959 |